United States Patent

[11] 3,604,001

[72] Inventor Robert E. Deal
Dayton, Ohio
[21] Appl. No. 690,698
[22] Filed Dec. 5, 1967
[45] Patented Sept. 7, 1971
[73] Assignee The United States of America as represented by the Secretary of the Air Force

[54] METHOD AND APPARATUS FOR LOCATING COOPERATIVE PERSONNEL IN DENSELY FOLIATED AREAS
1 Claim, 5 Drawing Figs.

[52] U.S. Cl. ..................................... 343/18 C, 343/706
[51] Int. Cl. ........................................ H01q 15/18
[50] Field of Search ............................ 343/18 B, 18 C, 706

[56] References Cited
UNITED STATES PATENTS

| | | | |
|---|---|---|---|
| 2,366,423 | 1/1945 | Pear, Jr. ................ | 343/706 X |
| 2,570,549 | 10/1951 | Hansell ................... | 343/18 B |
| 3,229,290 | 1/1966 | Fisher .................... | 343/18 B |
| 3,248,735 | 4/1966 | Bartolini ................. | 343/706 X |
| 3,181,158 | 4/1965 | Feldman .................. | 343/18 C |
| 3,273,153 | 9/1966 | Icenbice, Jr. ............ | 343/706 |
| 3,283,328 | 11/1966 | Wood ..................... | 343/18 C |

OTHER REFERENCES

Klass, Infrared Challenges Radar's Monopoly, 3-1957, pp. 50-51, 57, 59, 61

Primary Examiner—Rodney D. Bennett, Jr.
Assistant Examiner—Brian L. Ribando
Attorneys—Harry A. Herbert, Jr. and Richard J. Killoren ABSTRACT: A balloon-filled with a gas such as helium supports a retroreflector on a line which is secured to the ground. The balloon supports the retroreflector above the trees and foliage. The retroreflector provides a position indication to an aircraft when the area is illuminated with light in the invisible spectrum, such as from a GaAs laser. The return light energy is sensed with an image converter.

INVENTOR.
ROBERT E. DEAL
BY Harry A. Herbert Jr.
ATTORNEY

Richard J Killoren
AGENT

3,604,001

METHOD AND APPARATUS FOR LOCATING COOPERATIVE PERSONNEL IN DENSELY FOLIATED AREAS

BACKGROUND OF THE INVENTION

In some tactical situations it is necessary for airborne searchers to locate cooperative ground personnel in remote or densely foliated areas, such as in air drops of cargo or in rescuing downed pilots. In some of these situations the use of radio transmitters, smoke and flares is undesirable. Therefore, other means must be provided to give the precise location of the ground personnel to the aircraft.

SUMMARY OF THE INVENTION

According to this invention a small retroreflector array is supported on a line or cord which in turn is supported by a camouflaged balloon. The retroreflector array is made with very small corner reflectors having their axes of symmetry projecting upward from the horizontal at an angle of 45° or greater. The reflectors are illuminated with a light in the invisible spectrum such as from an airborne GaAs laser. The return from the reflectors may be viewed with an image converter.

DESCRIPTION OF THE PREFERRED EMBODIMENT

Figure 1:
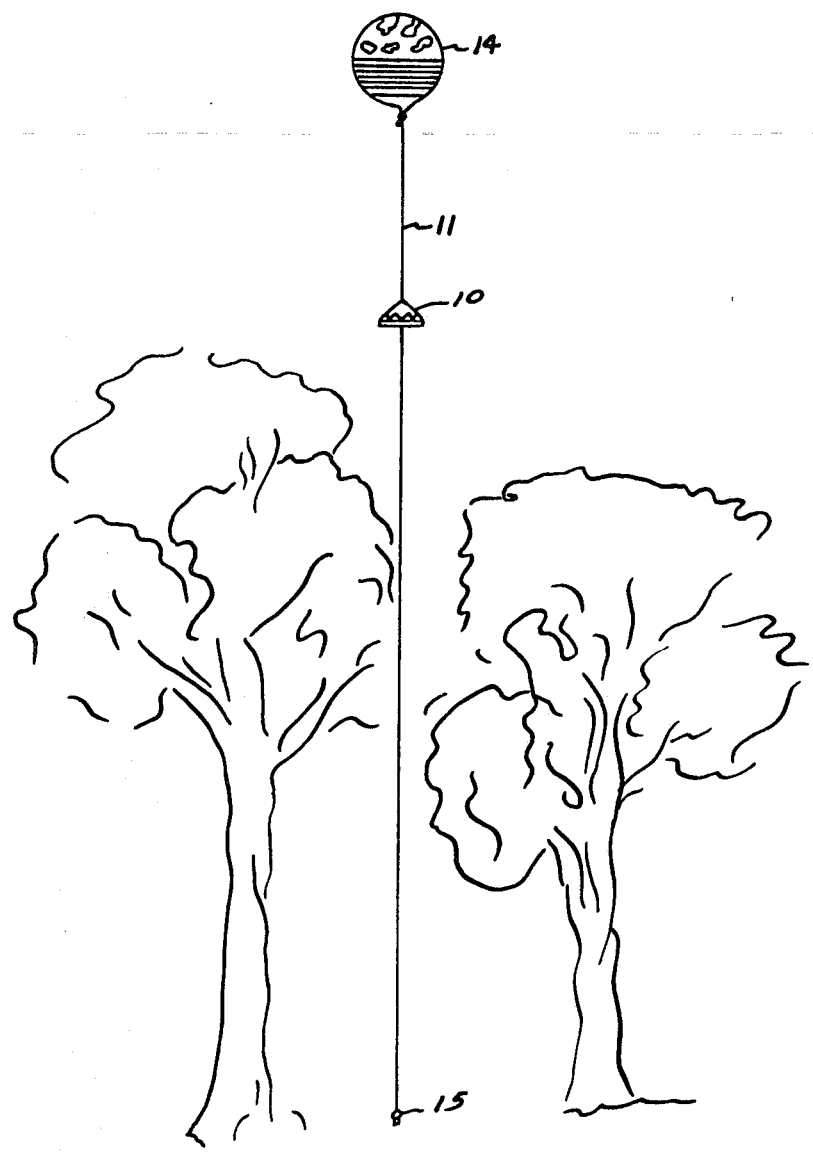
FIG. 1 is a schematic diagram showing ground position marker assembly of the invention.

Reference is now made to FIG. 1 of the drawing which shows a retroreflector array 10 supported on a line 11, which may be nylon cord. One end of the line 11 is tied to a balloon 14 which is inflated with a lighter-than-air gas such as helium. The balloon may be inflated by means of a standard high-pressure helium capsule. The other end of the line 11 may be secured on the ground in any well-known manner, such as by securing it to the limb of a tree or to a stake 15 driven into the ground.

Figure 2:
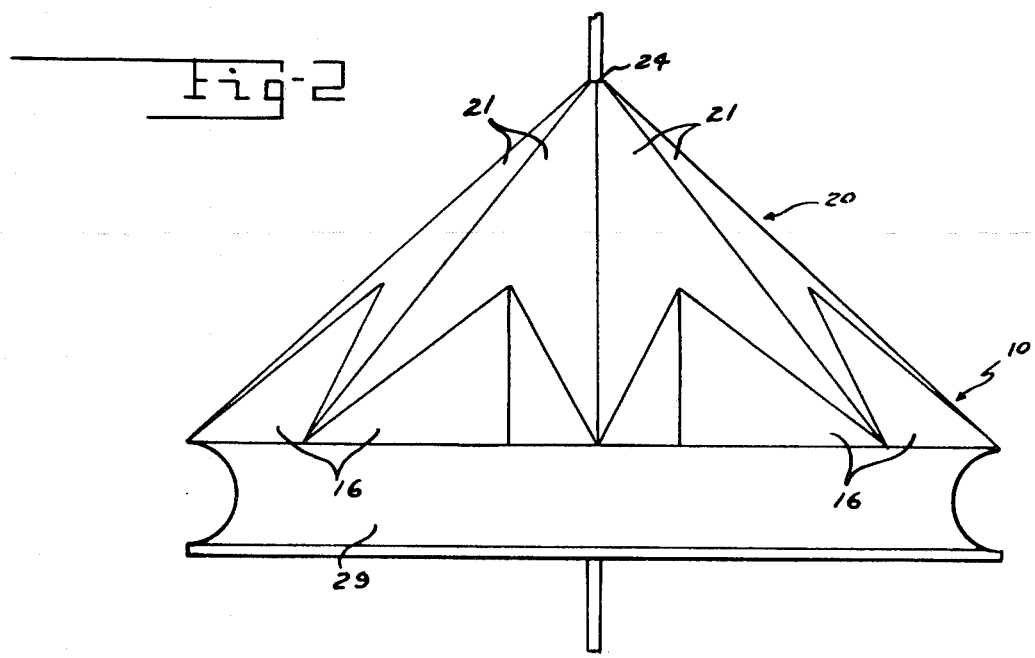
FIG. 2 is a side elevation of the corner reflector array of the device of FIG. 1.
Figure 3:
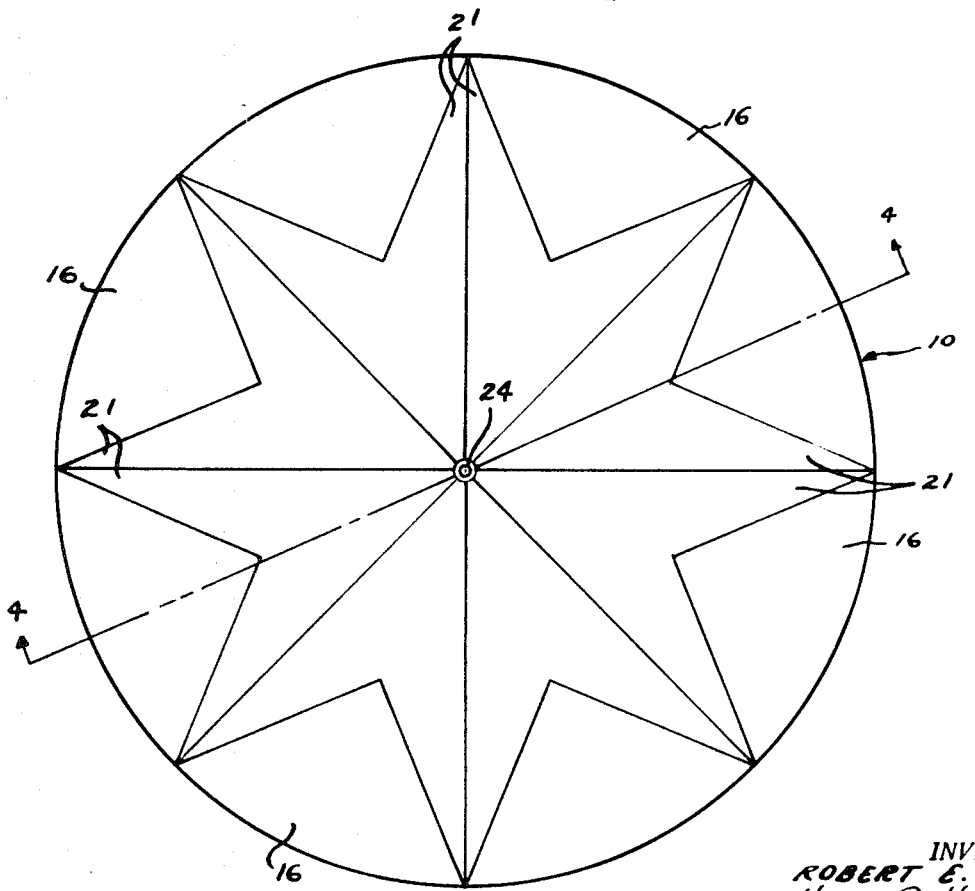
FIG. 3 is a top plan view of the device of FIG. 2.
Figure 4:
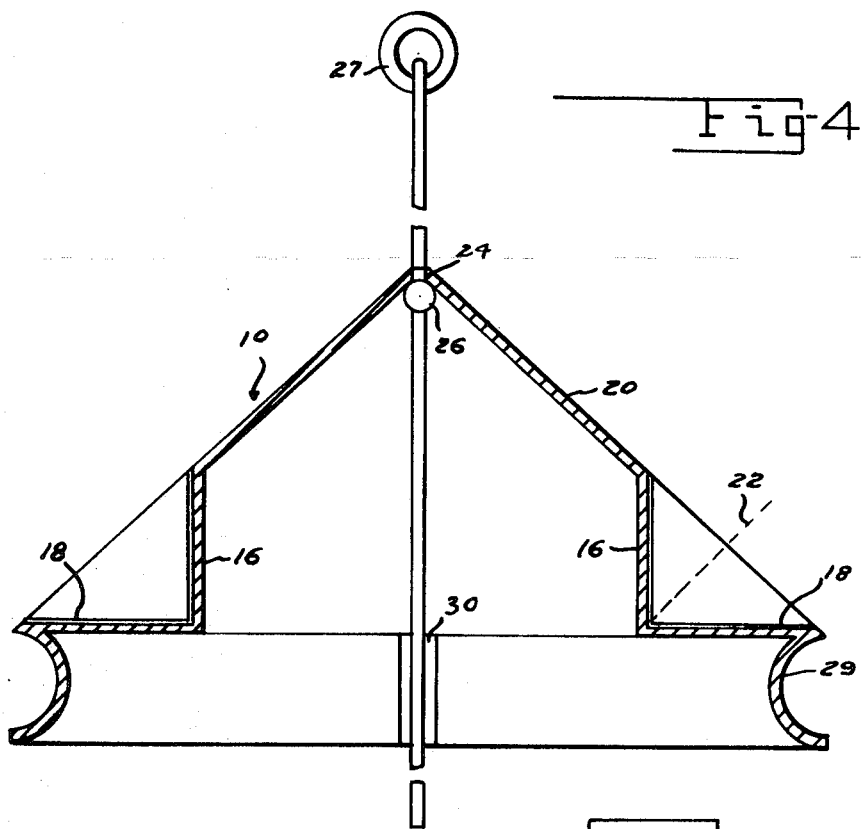
FIG. 4 is a sectional view of the device of FIG. 3 along the line 4—4.

As shown in FIGS. 2–4, the retroreflector array 10 may be made of a material such as plastic with a plurality of corner sections 16 molded into the top surface around the periphery thereof. The surfaces of the corner sections 16 are coated with a reflecting material 18 such as aluminum as shown in FIG. 4. The upper portion 20 of the reflector array may have a generally conical shape or may have a plurality of intersecting flat surfaces 21 as shown. The axes of symmetry, of the corner sections 16, as indicated at 22, should lie on a line at an angle of 45° or greater to the horizontal. A small opening 24 is provided in the top of the reflector array for receiving the line 11. The line 11 has an enlargement 26 to support the reflector array at a predetermined distance from the balloon. The enlargement may be a knot in the line or a plastic bead secured to the line. A ring 27, to which the balloon may be attached, may be secured to the upper end of line 11. However, the line 11 can be tied directly to the balloon, if desired.

A spool 29, on which the line is wound, may be provided on the reflector array. A slot 30 is provided through which the line 11 passes when it is wound on the spool 29.

For daytime use, the under surface of the reflector array and balloon should be painted a light blue, and the top of the balloon should be provided with standard forest camouflage paint.

Figure 5:
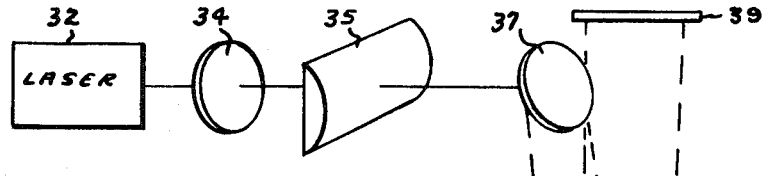
FIG. 5 is a schematic diagram of the airborne equipment for use with the device of FIG. 1.

One system that may be used in the aircraft is shown in FIG. 5. The light from laser 32 is converted into a flat beam by means of lenses 34 and 35. The flat beam is then scanned across the area in a direction perpendicular to the direction of flight by means of a scanning mirror 37. Conventional drive means may be provided for moving the mirror. The return light energy is passed through an infrared filter 39 and is then sensed with a standard image converter 41.

In the operation of the device, the downed pilot will inflate the balloon with a helium capsule and then secure the balloon to the line 11 such as by tying the balloon to the ring 27. The balloon is then permitted to ascend taking the reflector with it. When the reflector is at the desired height above the trees or foliage, the lower end of the line is secured such as by tying it to a stake driven into the ground or in any other known manner.

The area is swept with an invisible light source such as infrared from a GaAs laser aboard a rescue aircraft. The laser beam is swept over the ground in the conventional manner. The return energy is then detected with an image converter, for example, the standard snooper scope.

While the device has been disclosed as used with infrared light from a GaAs laser, it is to be understood that any invisible light source may be used. Also the laser beam could be moved over the ground by manually moving the laser light source. Furthermore, any well-known means can be used for sensing the return energy.

There is thus provided a method and apparatus for locating personnel such as downed pilots in densely foliated areas on the ground.

While a certain specific embodiment has been described, it is obvious that numerous changes may be made without departing from the general principles and scope of the invention.

I claim:

1. The method of locating downed pilots comprising; supporting an infrared retroreflective array device which has been painted on the bottom with blue camouflage paint, above the surrounding foliage on a line supported by a helium gas-filled balloon, which has been camouflaged by painting the bottom with blue camouflage paint and the top with standard forest camouflage paint, with the axis of symmetry of all the reflectors being directed upward at an angle of 45° or greater from the horizontal; securing the line to the ground in the position of the downed pilot; scanning the area from an aircraft with a beam of infrared radiation; sensing the return radiation with an infrared sensitive image converter tube.